Oct. 5, 1926.
B. HASKELL
LOAD CONTROLLED AIR BRAKE
Filed Dec. 23, 1925
1,602,108
2 Sheets-Sheet 2
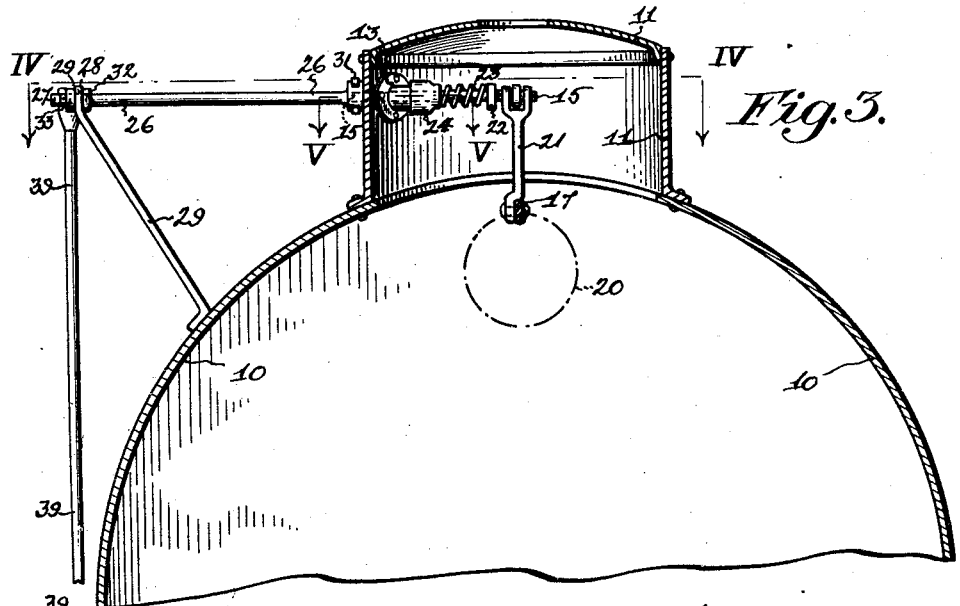

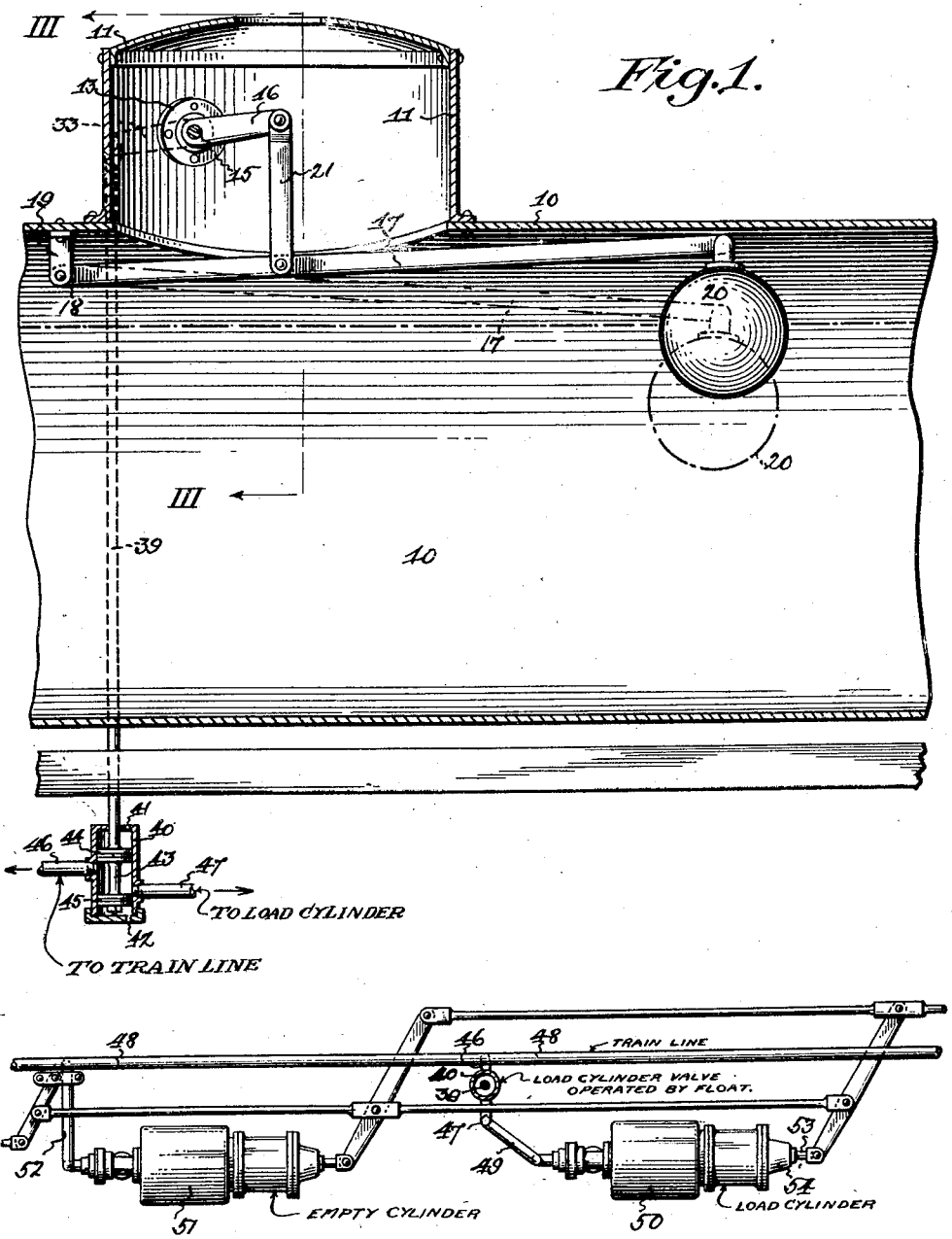

Patented Oct. 5, 1926.

1,602,103

UNITED STATES PATENT OFFICE.

BRODERICK HASKELL, OF FRANKLIN, PENNSYLVANIA.

LOAD-CONTROLLED AIR BRAKE.

Application filed December 23, 1925. Serial No. 77,347.

This invention relates to fluid pressure brakes and more particularly to what is known as "load brake" apparatus devised especially for use in connection with tank cars or containers for transporting fluids, or other materials capable of actuating a float, whereby the braking power may be automatically adjusted according to the level of the fluid or weight of the load, in order that the braking power be correctly limited to a safe degree upon empty cars and properly and greatly increased upon full or loaded tank cars.

The objects of the invention are:

First; to provide a simple and automatic device of the character herein indicated which is operative by the changing of the level of the fluid or load, and avoid the use of springs, fluid packing elements, or their equivalents, whereby all danger of operativeness due to disarrangement or breaking of springs or the like is eliminated.

Second; to provide an automatic device of the character indicated in which all the elements or rods controlled or actuated by the fluid or variation of level of the load within the car are removed from contact with the load, and do not pass through a section of the car which is below the upper level of the fluid or load, thereby avoiding the necessity of stuffing boxes below the fluid level and eliminating all danger of leakage due to distortion of the connecting rods and wearing out of the packing elements.

Third; to provide a load controlled air brake which is so constructed and arranged to avoid the use of stuffing boxes having the packing elements under heavy pressure thereby preventing the controlling mechanism becoming inoperative by binding or sticking of said controlling elements such as connecting rods during their actuation or reciprocation through said stuffing boxes.

Fourth; to provide a load controlled air brake for tank cars with such a construction and arrangement of operating elements so that in case of accidents or wrecks the elements on the exterior of the cars will be readily and easily detached from elements within the car and actuation by the level of the fluid within the car, thereby insuring no material distortion or injury of controlling mechanism within the car.

Fifth; to provide a load controlled air brake mechanism in which all possibility of leakage of an inflammable fluid being transported in the tank car is eliminated, so that in case of wrecks the losses due to fire are reduced to a minimum.

Other objects and advantages of the invention will appear from the detailed description of the construction and arrangement of parts and mode of operation to be presently disclosed.

The invention consists of structural characteristic and relative arrangements of elements which will be hereinafter more fully described and particularly pointed out in the appended claims.

In the accompanying two sheets of drawings in which similar reference characters indicate the same parts in the several figures, Figure 1 is a longitudinal section of the middle portion of a tank car with the present invention applied thereto;

Figure 2 is a plan view showing the manner of arranging the empty and load brake cylinders and train pipe connections with the present invention;

Figure 3 is a transverse section taken on line III—III of Figure 1;

Figure 4 is a section taken on line IV—IV of Figure 3;

Figure 5 is an enlarged sectional view taken on line V—V of Figure 3;

Figure 6 is a section taken on line VI—VI of Figure 5; and

Figure 7 is a view similar to Figure 1 of a modified form of the invention.

Referring to Figures 1, 3, 4, 5 and 6, 10 represents a fragment of the center portion of the shell of the usual tank car having the dome portion 11, as is usual in said type of cars used preferably for conveying oil or other fluid material. Above the base of the dome 11 is provided an opening 12, see Figure 5, in which is fastened a sleeve 13 having an inner elongated cylindrical bearing surface 14, and a dished inner end 141. Supported in said sleeve 13 and within the bearing surface 14 is a rotatable rod 15 having secured at its end within the dome 11, a crank arm 16. 17 is a lever one end 18 of which is pivotally connected to the lower end of a depending lug 19 secured to the inner side of the car 10 adjacent to the dome 11. At the other and free end of the lever 17 is provided a hollow body, buoyant member or float 20, which is adapted to be raised or lowered by the action of fluid material or load within the car for purposes to be presently described.

21 is a link which pivotally connects the end of the crank arm 16 with a point on the lever 17 between pivoted end 18 and free end having the float 20, as shown in Figure 1.

The inner end of the rotatable rod 15 is rotatably supported in a bracket 22 secured to the inner side of the dome 11, see Figure 4, and is provided and surrounded by a coil spring 23, one end of which spring abuts against said bracket 22, while the other end of said spring 23 abuts against the cup shaped member 24, see Figure 5, surrounding and slidably fitted to the dished end 141 of the sleeve 13 and forces any suitable packing 25 around the rotatable rod 15 to prevent leakage, as will be readily understood.

The outer end of the rotatable rod 15 is extended by detachably connecting thereto a rod 26 whose outer end 27 is rotatably supported within an opening 28 in the upper end of a rigid strut 29 preferably secured to the outside of the tank car 10, as shown in Figures 3 and 4, while the inner end of the extension rod 26 is detachably connected to the rod 15, by means of providing registering slots 30, 30 in the abutting ends of said rods 15 and 26 and a thin plate or pin 31 whose ends are upset, as shown in Figures 5 and 6, thereby forming a readily detachable and safety coupling between the abutting ends of said rods 15 and 26, and should the tank car be thrown on its side due to a wreck said rod 15 would remain undisturbed in the sleeve 13 and its bearing 14 and prevent leakage of the fluid load.

A collar 32 surrounds and is fixed to the rod 26 so that the same abuts on the inner side of the bracket 29 for the purpose of holding the rods 15 and 26 against displacement and proper relation with respect to the controlling device within the dome 11.

At the outer end of the rod 26 is secured a crank arm 33 whose free end is pivotally connected to an upright and depending rod 39 passing to the side of the tank car 10. The lower end of the rod 39 passes into a valve chamber 40 having vent holes 41 and 42 in its heads and is connected with and reciprocates in said chamber 40 a double balanced distributing valve 43 having ends 44 and 45, as clearly shown in Figure 1.

Leading into and communicating with the interior of the valve chamber 40 at points illustrated are pipes 46 and 47, said pipe 46 being in communication with the train pipe line 48, see Figure 2, while pipe 47 through pipe connection 49 connects with load brake cylinder 50, and the empty brake cylinder 51 by means of the pipe connection 52, communicates with the train pipe line 48, said empty and load brake cylinders 51 and 50 being linked up with the usual brake gearing as is common in this class of devices and needs no further disclosure, and in the case illustrated in Figure 2 when the empty brake cylinder is only functioning the piston rod 53 moves in and out of sleeve 54 of the load brake cylinder 50, see Figure 2, and no braking is carried out by said load brake cylinder 50.

Figure 7 shows a modification of the buoyant member in which a cork float 55 is provided and fixed to reciprocating rod 56 the lower end passing through a guide bracket 57 and its upper end pivoted to the crank arm 16 connected to the rods 15, 26 and 39, described above, and while I have shown the preferred form of operating the valve controlling elements said float or buoyant member may be arranged above or below the lever 17, and said lever may be of any order, and the buoyant member of any suitable material or construction.

The parts being constructed and arranged, as shown in full lines in Figure 1, the tank 10 is filled with a fluid and the float 20 is in the position shown in full line, the rod 39 adjusts the valve 43, so that the pressure from the train pipe 48 will be conveyed into the pipe 46 and thence into the valve chamber 40 between the two ends 44 and 45 of the distributing valve 43 and thence by pipes 47 and 49 to the load brake cylinder 50 and actuates the brakes under much greater pressure and to a degree required for the efficient operation of a full tank car and said load brake cylinder 50, operates in addition to the empty brake cylinder 51, as said cylinder 51 is constantly in connection with the train pipe 48 by means of the independent pipe connection 52.

When the car 10 is being transported empty and no fluid is within the tank to act on the float 20, lever 17 and float 20 assume the position shown in dotted lines in Figure 1, causing the rod 39 to raise the valve 43, so that its lower end 45 is above the inlet of the pipe 47 and hence air pressure is incapable of being conveyed from train pipe 48 through pipe 46 to the load brake cylinder 50, and hence the braking gear will only be under pressure of the empty brake cylinder, as will be readily understood and needs no further disclosure.

From the foregoing disclosure of the construction and arrangement of the improvement and mode of applying the same, it will be seen that all the objects and advantages recited in the statement of invention have been fully and efficiently carried out, and while I have shown and described my preferred form of the load brake apparatus, many changes will readily suggest themselves without in any way departing from the salient features herein disclosed and embodied in the scope of the claims, and while I have not herein claimed the broad invention herein disclosed, such is the subject matter of the claims in my former U. S. Patent, No. 1,452,199, granted April 17, 1923.

What I claim is:—

1. A load brake apparatus for a car comprising a device within and at the upper section of the car and removed from the load within the car for varying the braking power and a float actuated by the fluid material forming the load on the car at varying levels for adjusting said device.

2. A load brake apparatus for a car comprising a device within and at the upper section of the car and removed from the upper level of the load within the car for varying the braking power and means actuated by the material forming the load within the car for adjusting said device.

3. A load brake apparatus for a car, the combination with an empty brake cylinder, a load brake cylinder, a valve mechanism for controlling the brake pressure in either solely in the empty brake cylinder or simultaneously in the empty and load brake cylinders, a device within and at the upper section of the car and removed from the load within the car for varying the braking power and a float actuated by the fluid material forming the load on the car which float at varying levels adjusts said valve mechanism to convey pressure in either solely in the empty brake cylinder or simultaneously in said empty and load brake cylinders.

4. A load brake apparatus for a tank car comprising a valve mechanism exterior of the car for actuating the brake rigging, a device within and at the upper section of the car and removed from the load within the car for varying the braking power, a float actuated by the fluid material forming the load on the car which float at varying levels adjusts said device, and means exterior of the car for separably connecting said valve mechanism with said device within and at the upper section of the car.

5. A load brake apparatus for a tank car having a dome at its upper section comprising a device within said dome of the car and removed from the load within the car for varying the braking power and a float actuated by the fluid material forming the load on the car at varying levels for adjusting said device.

6. A load brake apparatus for a tank car having a dome at its upper section comprising a device within said dome of the car and removed from the upper level of the load within the car for varying the braking power and means actuated by the material forming the load within the car for adjusting said device.

7. A load brake apparatus for a tank car having a dome at its upper section, the combination with an empty brake cylinder, a load brake cylinder, a valve mechanism for controlling the brake pressure in either solely in the empty brake cylinder or simultaneously in the empty and load brake cylinders, a device within said dome of the car and removed from the load within the car for varying the braking power and a float actuated by the fluid material forming the load on the car at varying levels for adjusting said valve mechanism to convey pressure in either solely in the empty brake cylinder or simultaneously in said empty and load brake cylinders.

In testimony whereof I affix my signature.

BRODERICK HASKELL.